(12) United States Patent
Qi et al.

(10) Patent No.: US 10,783,171 B2
(45) Date of Patent: Sep. 22, 2020

(54) ADDRESS SEARCH METHOD AND DEVICE

(71) Applicant: Huawei Technologies Co., Ltd., Shenzhen (CN)

(72) Inventors: Quan Qi, Shenzhen (CN); Jiulong Zhang, Shenzhen (CN); Hang Li, Hong Kong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 667 days.

(21) Appl. No.: 15/398,260

(22) Filed: Jan. 4, 2017

(65) Prior Publication Data
US 2017/0116224 A1 Apr. 27, 2017

Related U.S. Application Data

(63) Continuation of application No. PCT/CN2015/079816, filed on May 26, 2015.

(30) Foreign Application Priority Data

Sep. 30, 2014 (CN) .......................... 2014 1 0525978

(51) Int. Cl.
*G06F 16/29* (2019.01)
*G06F 16/9038* (2019.01)
(Continued)

(52) U.S. Cl.
CPC .......... *G06F 16/29* (2019.01); *G01C 21/3611* (2013.01); *G06F 16/00* (2019.01);
(Continued)

(58) Field of Classification Search
CPC ...... G06F 17/27; G06F 17/2735; G06F 16/29; G06F 16/258; G06F 16/86
See application file for complete search history.

(56) References Cited

U.S. PATENT DOCUMENTS 6,487,495 B1  11/2002 Gale et al.
6,934,634 B1   8/2005 Ge
(Continued)

FOREIGN PATENT DOCUMENTS

CN     101350012 A    1/2009
CN     101719128 A    6/2010
(Continued)

OTHER PUBLICATIONS

Tian et al. "Using an Optimized Chinese Address Matching Method to develop a Geocoding Service: A Case Study of ShenZhen, China", ISPRS May 13, 2016. (Year: 2016).*
(Continued)

*Primary Examiner* — Yuk Ting Choi
(74) *Attorney, Agent, or Firm* — Conley Rose, P.C.

(57) ABSTRACT

An address search method and device, includes acquiring address search request information, determining to-be-found destination address information included in the address search request information, splitting the destination address information into at least one piece of sub-address information, where the destination address information is formed by multiple pieces of sub-address information, and the multiple pieces of sub-address information respectively correspond to different address types, matching the at least one piece of sub-address information or the at least one piece of sub-address information and the destination address information with different address information included in an address database, where each piece of address information stored in the address database includes different sub-address information that forms the address information, and setting address information that is obtained by matching and whose match degree is greater than a set threshold as found destination address information for output.

20 Claims, 2 Drawing Sheets

(51) Int. Cl.
*G06F 16/9535* (2019.01)
*G06F 16/9032* (2019.01)
*G06F 16/00* (2019.01)
*G01C 21/36* (2006.01)

(52) U.S. Cl.
CPC .... *G06F 16/9038* (2019.01); *G06F 16/90332* (2019.01); *G06F 16/9535* (2019.01)

(56) References Cited

U.S. PATENT DOCUMENTS

| | | | | |
|---|---|---|---|---|
| 7,376,636 | B1* | 5/2008 | Wang | G06F 16/284 707/694 |
| 2009/0177643 | A1* | 7/2009 | Gupta | G06F 17/27 707/999.005 |
| 2011/0270815 | A1* | 11/2011 | Li | G06F 16/24522 707/706 |
| 2015/0031397 | A1* | 1/2015 | Jouaux | G01C 21/00 455/456.3 |

FOREIGN PATENT DOCUMENTS

| | | | |
|---|---|---|---|
| CN | 101882163 A | 11/2010 | |
| CN | 101996248 A | 3/2011 | |
| CN | 101350012 * | 1/2013 | ............ G06F 17/30 |
| CN | 103914544 A | 7/2014 | |
| EP | 2267618 A2 | 12/2010 | |
| WO | 2013155619 A1 | 10/2013 | |

OTHER PUBLICATIONS

Foreign Communication From A Counterpart Application, European Application No. 15846022.0, Partial Supplementary European Search Report dated Jul. 11, 2017, 17 pages.
Machine Translation and Abstract of Chinese Publication No. CN103914544, dated Jul. 9, 2014, 16 pages.
Foreign Communication From A Counterpart Application, Chinese Application No. 201410525978.X, Chinese Office Action dated Nov. 14, 2018, 6 pages.
Machine Translation and Abstract of Chinese Publication No. CN101350012, dated Jan. 21, 2009, 18 pages.
Machine Translation and Abstract of Chinese Publication No. CN101719128, dated Jun. 2, 2010, 10 pages.
Machine Translation and Abstract of Chinese Publication No. CN101882163, dated Nov. 10, 2010, 9 pages.
Machine Translation and Abstract of Chinese Publication No. CN101996248, dated Mar. 30, 2011, 14 pages.
Foreign Communication From A Counterpart Application, PCT Application No. PCT/CN2015/079816, English Translation of International Search Report dated Aug. 24, 2015, 2 pages.
Foreign Communication From A Counterpart Application, PCT Application No. PCT/CN2015/079816, English Translation of Written Opinion dated Aug. 24, 2015, 7 pages.
Zhang, X., et al., Automatic Extraction of Destinations, Origins and Route Parts from Human Generated Route Directions, XP019149350, Geographic Information Science, Sep. 14, 2010, pp. 279-294.
Xiaoying, L., et al., "Sentence Similarity based on Dynamic Time Warping," XP031138650, IEEE International Conference on Semantic Computing, Sep. 2007, pp. 250-256.
Lin, L., et al., "Measuring Sentence Similarity from Different Aspects," XP031517774, International Conference on Machine Learning and Cybernetics, Jul. 12, 2009, pp. 2244-2249.
Federica M., et al., "A Syntactic Approach for Searching Similarities within Sentences," XP058341541, International Conference on Information Knowledge Management, Nov. 4, 2002, pp. 635-637.
Foreign Communication From A Counterpart Application, European Application No. 15846022.0, Extended European Search Report dated Sep. 18, 2017, 19 pages.

\* cited by examiner

ADDRESS SEARCH METHOD AND DEVICE

CROSS-REFERENCE TO RELATED APPLICATIONS

This application is a continuation of International Patent Application No. PCT/CN2015/079816 filed on May 26, 2015, which claims priority to Chinese Patent Application No. 201410525978.X filed on Sep. 30, 2014. The disclosures of the aforementioned applications are hereby incorporated by reference in their entireties.

TECHNICAL FIELD

The present application relates to the field of data processing technologies, and in particular, to an address search method and device.

BACKGROUND

With the development of communications technologies and terminal technologies, increasingly more applications depend on mobile terminals, particularly navigation applications. For example, a user can initiate a navigation request to a mobile terminal in a voice or text input manner, and a navigation application selects a navigation route according to the received navigation request, and pushes the selected navigation route to the user.

Further, a manner in which the navigation application selects the navigation route according to the received navigation request includes but is not limited to the following.

A conditional random field (CRF) algorithm is used to extract an address name or a building name/organization name from the received navigation request, and determine a destination address of the navigation request using the extracted address name or building name/organization name when the navigation request is entered in a text form.

Address information included in the voice is used as a search basis to determine a destination address of the navigation request when the navigation request is entered in a voice form.

A disadvantage is when the destination address is being determined, only the address name (or the building name/organization name) extracted from the text or voice input is used to match address information in an address database. As a result, a determined destination address set includes many irrelevant addresses, which reduces accuracy of address searching.

SUMMARY

In view of this, embodiments of the present application provide an address search method and device in order to solve a currently existing problem that address searching accuracy is relatively low because multiple irrelevant addresses are found in an address search process.

According to a first aspect of the present application, an address search method is provided, including acquiring address search request information, determining to-be-found destination address information included in the address search request information, splitting the destination address information into at least one piece of sub-address information, where the destination address information is formed by multiple pieces of sub-address information, and the multiple pieces of sub-address information respectively correspond to different address types, matching the at least one piece of sub-address information or the at least one piece of sub-address information and the destination address information with different address information included in an address database, where each piece of address information stored in the address database includes different sub-address information that forms the address information, and setting address information that is obtained by the matching and whose match degree is greater than a set threshold as found destination address information for output.

With reference to the first aspect of the present application, in a first possible manner, acquiring address search request information includes receiving entered voice data, where the voice data is used to initiate an address search, and performing recognition on the voice data to obtain the to-be-found destination address information included in the voice data.

With reference to the first aspect of the present application, or with reference to the first possible implementation manner of the first aspect of the present application, in a second possible manner, the to-be-found destination address information is obtained in the following manner. Determining at least one keyword included in the address search request information, finding, from preset text address dictionaries corresponding to different address types, a text address dictionary including the keyword for each determined keyword, and replacing the keyword with a string used to denote an address type corresponding to the found text address dictionary, determining, using a regular expression used to represent address information, whether a string group formed after each keyword is replaced with a corresponding string represents address information, determining, according to the string group, a quasi address string corresponding to the to-be-found destination address information when the string group represents address information, and setting the quasi address string as a CRF feature, and extracting the to-be-found destination address information from the address search request information based on a CRF algorithm.

With reference to the second possible implementation manner of the first aspect of the present application, in a third possible implementation manner, determining, according to the string group, a quasi address string corresponding to the to-be-found destination address information includes determining that multiple strings are included in the string group, and that keywords that are respectively replaced with the multiple strings are continuous in position in the address search request information, combining the multiple strings into one string group based on continuity of positions of the replaced keywords, as the quasi address string corresponding to the to-be-found destination address information if none of the multiple strings is a duplicate, and removing the duplicate string, and combining at least one string obtained after the duplicate string is removed into one string group based on continuity of positions of the replaced keywords, as the quasi address string corresponding to the to-be-found destination address information if any of the multiple strings is a duplicate.

With reference to the first aspect of the present application, or with reference to the first possible implementation manner of the first aspect of the present application, or with reference to the second possible implementation manner of the first aspect of the present application, or with reference to the third possible implementation manner of the first aspect of the present application, in a fourth possible manner, splitting the destination address information into at least one piece of sub-address information includes splitting, according to the address types represented by the preset text address dictionaries corresponding to different address types, the destination address information into sub-address information corresponding to the different address types.

With reference to the first aspect of the present application, or with reference to the first possible implementation manner of the first aspect of the present application, or with reference to the second possible implementation manner of the first aspect of the present application, or with reference to the third possible implementation manner of the first aspect of the present application, or with reference to the fourth possible implementation manner of the first aspect of the present application, in a fifth possible manner, the address type includes one or a combination of multiple of the following information, administrative region information, road name information, building/organization name information, auxiliary content of the road name, and auxiliary content of the building/organization name.

With reference to the first aspect of the present application, or with reference to the first possible implementation manner of the first aspect of the present application, or with reference to the second possible implementation manner of the first aspect of the present application, or with reference to the third possible implementation manner of the first aspect of the present application, or with reference to the fourth possible implementation manner of the first aspect of the present application, or with reference to the fifth possible implementation manner of the first aspect of the present application, in a sixth possible manner, matching the at least one piece of sub-address information or the at least one piece of sub-address information and the destination address information with different address information included in an address database includes correspondingly matching each of the at least one piece of sub-address information in the destination address information with sub-address information of a same address type in the address database.

With reference to the first aspect of the present application, or with reference to the first possible implementation manner of the first aspect of the present application, or with reference to the second possible implementation manner of the first aspect of the present application, or with reference to the third possible implementation manner of the first aspect of the present application, or with reference to the fourth possible implementation manner of the first aspect of the present application, or with reference to the fifth possible implementation manner of the first aspect of the present application, in a seventh possible manner, matching the at least one piece of sub-address information or the at least one piece of sub-address information and the destination address information with different address information included in an address database includes selecting one piece of address information from the address database, determining sub-address information included in the selected address information, performing matching calculation between each of the at least one piece of sub-address information included in the to-be-found destination address and the sub-address information included in the selected address information to obtain a first match degree, where an address type of the sub-address information that is included in the to-be-found destination address and for which matching calculation is performed is the same as an address type of the sub-address information included in the selected address information, and obtaining a total match degree between the selected address information and the to-be-found destination address information according to the first match degree.

With reference to the seventh possible implementation manner of the first aspect of the present application, in an eighth possible manner, obtaining a total match degree between the selected address information and the to-be-found destination address information according to the first match degree includes performing matching calculation between the selected address information and the to-be-found destination address information to obtain a second match degree, and obtaining the total match degree between the selected address information and the to-be-found destination address information according to the first match degree and the second match degree.

With reference to the sixth possible implementation manner of the first aspect of the present application, or with reference to the seventh possible implementation manner of the first aspect of the present application, or with reference to the eighth possible implementation manner of the first aspect of the present application, in a ninth possible manner, the performing matching calculation between sub-address information included in the to-be-found destination address and the sub-address information included in the selected address information to obtain a first match degree includes that for each piece of sub-address information included in the to-be-found destination address information, finding, from the selected address information, sub-address information whose address type is the same as that of the sub-address information for the sub-address information, calculating an editing distance required for mutual conversion between the sub-address information and the found sub-address information, and calculating the first match degree according to an editing distance obtained corresponding to each piece of sub-address information included in the to-be-found destination address information.

With reference to the sixth possible implementation manner of the first aspect of the present application, or with reference to the seventh possible implementation manner of the first aspect of the present application, or with reference to the eighth possible implementation manner of the first aspect of the present application, or with reference to the ninth possible implementation manner of the first aspect of the present application, in a tenth possible manner, setting address information that is obtained by matching and whose match degree is greater than a set threshold as found destination address information for output includes obtaining, by means of calculation, a total match degree between address information selected each time and the to-be-found destination address information, and determining in sequence a set quantity of total match degrees in descending order of the total match degrees, and setting address information selected corresponding to the determined total match degrees as the found destination address information for output.

According to a second aspect of the present application, an address search device is provided, including an acquiring module configured to acquire address search request information, and determine to-be-found destination address information included in the address search request information, a splitting module configured to split the destination address information determined by the acquiring module into at least one piece of sub-address information, where the destination address information is formed by multiple pieces of sub-address information, and the multiple pieces of sub-address information respectively correspond to different address types, and a searching module configured to match the at least one piece of sub-address information obtained by the splitting module or the at least one piece of sub-address information and the destination address information with different address information included in an address database, where each piece of address information stored in the address database includes different sub-address information that forms the address information, and set address information that is obtained by the matching and whose match degree is greater than a set threshold as found destination address information for output.

With reference to the second aspect of the present application, in a first possible manner, the acquiring module is further configured to receive entered voice data, where the voice data is used to initiate an address search, and perform recognition on the voice data to obtain the to-be-found destination address information included in the voice data.

With reference to the second aspect of the present application, or with reference to the first possible implementation manner of the second aspect of the present application, in a second possible manner, the acquiring module is further configured to obtain the to-be-found destination address information in the manner of determining at least one keyword included in the address search request information, finding, from preset text address dictionaries corresponding to different address types, a text address dictionary including the keyword for each determined keyword, and replacing the keyword with a string used to denote an address type corresponding to the found text address dictionary, determining, using a regular expression used to represent address information, whether a string group formed after each keyword is replaced with a corresponding string represents address information, determining, according to the string group, a quasi address string corresponding to the to-be-found destination address information when the string group represents address information, and setting the quasi address string as a CRF feature, and extracting the to-be-found destination address information from the address search request information based on a CRF algorithm.

With reference to the second possible implementation manner of the second aspect of the present application, in a third possible implementation manner, that the acquiring module is determining, according to the string group, a quasi address string corresponding to the to-be-found destination address information, which further includes determining that multiple strings are included in the string group, and that keywords that are respectively replaced with the multiple strings are continuous in position in the address search request information, combining the multiple strings into one string group based on continuity of positions of the replaced keywords, as the quasi address string corresponding to the to-be-found destination address information if none of the multiple strings is a duplicate, and removing the duplicate string, and combining at least one string obtained after the duplicate string is removed into one string group based on continuity of positions of the replaced keywords, as the quasi address string corresponding to the to-be-found destination address information if any of the multiple strings is a duplicate.

With reference to the second aspect of the present application, or with reference to the first possible implementation manner of the second aspect of the present application, or with reference to the second possible implementation manner of the second aspect of the present application, or with reference to the third possible implementation manner of the second aspect of the present application, in a fourth possible manner, the splitting module is further configured to split, according to the address types represented by the preset text address dictionaries corresponding to different address types, the destination address information into sub-address information corresponding to the different address types.

With reference to the second aspect of the present application, or with reference to the first possible implementation manner of the second aspect of the present application, or with reference to the second possible implementation manner of the second aspect of the present application, or with reference to the third possible implementation manner of the second aspect of the present application, or with reference to the fourth possible implementation manner of the second aspect of the present application, in a fifth possible manner, the address type includes one or a combination of multiple of the following information, administrative region information, road name information, building/organization name information, auxiliary content of the road name, and auxiliary content of the building/organization name.

With reference to the second aspect of the present application, or with reference to the first possible implementation manner of the second aspect of the present application, or with reference to the second possible implementation manner of the second aspect of the present application, or with reference to the third possible implementation manner of the second aspect of the present application, or with reference to the fourth possible implementation manner of the second aspect of the present application, or with reference to the fifth possible implementation manner of the second aspect of the present application, in a sixth possible manner, the searching module is further configured to correspondingly match each of the at least one piece of sub-address information in the destination address information with sub-address information of a same address type in the address database.

With reference to the second aspect of the present application, or with reference to the first possible implementation manner of the second aspect of the present application, or with reference to the second possible implementation manner of the second aspect of the present application, or with reference to the third possible implementation manner of the second aspect of the present application, or with reference to the fourth possible implementation manner of the second aspect of the present application, or with reference to the fifth possible implementation manner of the second aspect of the present application, in a seventh possible manner, the searching module is further configured to select one piece of address information from the address database, and determine sub-address information included in the selected address information, perform matching calculation between each of the at least one piece of sub-address information included in the to-be-found destination address and the sub-address information included in the selected address information to obtain a first match degree, where an address type of the sub-address information that is included in the to-be-found destination address and for which matching calculation is performed is the same as an address type of the sub-address information included in the selected address information, and obtain a total match degree between the selected address information and the to-be-found destination address information according to the first match degree.

With reference to the seventh implementation manner of the second aspect of the present application, in an eighth possible manner, that the searching module is obtaining a total match degree between the selected address information and the to-be-found destination address information according to the first match degree further includes performing matching calculation between the selected address information and the to-be-found destination address information to obtain a second match degree, and obtaining the total match degree between the selected address information and the to-be-found destination address information according to the first match degree and the second match degree.

With reference to the sixth possible implementation manner of the second aspect of the present application, or with reference to the seventh possible implementation manner of the second aspect of the present application, or with reference to the eighth possible implementation manner of the second aspect of the present application, in a ninth possible manner, that the searching module is performing matching calculation between sub-address information included in the to-be-found destination address and the sub-address information included in the selected address information to obtain a first match degree further includes for each piece of sub-address information included in the to-be-found destination address information, finding, from the selected address information, sub-address information whose address type is the same as that of the sub-address information for the sub-address information, calculating an editing distance required for mutual conversion between the sub-address information and the found sub-address information, and calculating the first match degree according to an editing distance obtained corresponding to each piece of sub-address information included in the to-be-found destination address information.

With reference to the sixth possible implementation manner of the second aspect of the present application, or with reference to the seventh possible implementation manner of the second aspect of the present application, or with reference to the eighth possible implementation manner of the second aspect of the present application, or with reference to the ninth possible implementation manner of the second aspect of the present application, in a tenth possible manner, that the searching module is setting address information that is obtained by the matching and whose match degree is greater than a set threshold as found destination address information for output further includes obtaining, by means of calculation, a total match degree between address information selected each time and the to-be-found destination address information, and determining in sequence a set quantity of total match degrees in descending order of the total match degrees, and setting address information selected corresponding to the determined total match degrees as the found destination address information for output.

According to a third aspect of the present application, an address search device is provided, including a signal receiver configured to acquire address search request information, and determine to-be-found destination address information included in the address search request information, a processor configured to split the destination address information into at least one piece of sub-address information, where the destination address information is formed by multiple pieces of sub-address information, and the multiple pieces of sub-address information respectively correspond to different address types, match the at least one piece of sub-address information or the at least one piece of sub-address information and the destination address information with different address information included in an address database, where each piece of address information stored in the address database includes different sub-address information that forms the address information, and set address information that is obtained by matching and whose match degree is greater than a set threshold as found destination address information for output.

With reference to the third aspect of the present application, in a first possible manner, the processor further executes receiving entered voice data, where the voice data is used to initiate an address search, and performing recognition on the voice data to obtain the to-be-found destination address information included in the voice data.

With reference to the third aspect of the present application, or with reference to the first possible implementation manner of the third aspect of the present application, in a second possible manner, the processor further executes obtaining to-be-found destination address information in the following manner. Determine at least one keyword included in the address search request information, find, from preset text address dictionaries corresponding to different address types, a text address dictionary including the keyword for each determined keyword, and replace the keyword with a string used to denote an address type corresponding to the found text address dictionary, determine, using a regular expression used to represent address information, whether a string group formed after each keyword is replaced with a corresponding string represents address information, determine, according to the string group, a quasi address string corresponding to the to-be-found destination address information when the string group represents address information, and set the quasi address string as a CRF feature, and extract the to-be-found destination address information from the address search request information based on a CRF algorithm.

With reference to the second possible implementation manner of the third aspect of the present application, in a third possible manner, the processor further executes the determining, according to the string group, a quasi address string corresponding to the to-be-found destination address information, which includes determining that multiple strings are included in the string group, and keywords that are respectively replaced with the multiple strings are continuous in position in the address search request information, combining the multiple strings into one string group based on continuity of positions of the replaced keywords, as the quasi address string corresponding to the to-be-found destination address information if none of the multiple strings is a duplicate, and removing the duplicate string if any of the multiple strings is a duplicate, and combining at least one string obtained after the duplicate string is removed into one string group based on continuity of positions of the replaced keywords, as the quasi address string corresponding to the to-be-found destination address information.

With reference to the third aspect of the present application, or with reference to the first possible implementation manner of the third aspect of the present application, or with reference to the second possible implementation manner of the third aspect of the present application, or with reference to the third possible implementation manner of the third aspect of the present application, in a fourth possible manner, the processor further executes splitting the destination address information into at least one piece of sub-address information, which includes splitting, according to the address types represented by the preset text address dictionaries corresponding to different address types, the destination address information into sub-address information corresponding to the different address types.

With reference to the third aspect of the present application, or with reference to the first possible implementation manner of the third aspect of the present application, or with reference to the second possible implementation manner of the third aspect of the present application, or with reference to the third possible implementation manner of the third aspect of the present application, or with reference to the fourth possible implementation manner of the third aspect of the present application, in a fifth possible manner, the address type includes one or a combination of multiple of the following information administrative region information, road name information, building/organization name information, auxiliary content of the road name, and auxiliary content of the building/organization name.

With reference to the third aspect of the present application, or with reference to the first possible implementation manner of the third aspect of the present application, or with reference to the second possible implementation manner of the third aspect of the present application, or with reference to the third possible implementation manner of the third aspect of the present application, or with reference to the fourth possible implementation manner of the third aspect of the present application, or with reference to the fifth possible implementation manner of the third aspect of the present application, in a sixth possible manner, the processor further executes correspondingly matching each of the at least one piece of sub-address information in the destination address information with sub-address information of a same address type in the address database.

With reference to the third aspect of the present application, or with reference to the first possible implementation manner of the third aspect of the present application, or with reference to the second possible implementation manner of the third aspect of the present application, or with reference to the third possible implementation manner of the third aspect of the present application, or with reference to the fourth possible implementation manner of the third aspect of the present application, or with reference to the fifth possible implementation manner of the third aspect of the present application, in a seventh possible manner, the processor further executes matching the at least one piece of sub-address information or the at least one piece of sub-address information and the destination address information with different address information included in an address database, which includes selecting one piece of address information from the address database, and determining sub-address information included in the selected address information, performing matching calculation between each of the at least one piece of sub-address information included in the to-be-found destination address and the sub-address information included in the selected address information to obtain a first match degree, where an address type of the sub-address information that is included in the to-be-found destination address and for which matching calculation is performed is the same as an address type of the sub-address information included in the selected address information, and obtaining a total match degree between the selected address information and the to-be-found destination address information according to the first match degree.

With reference to the seventh possible implementation manner of the third aspect of the present application, in an eighth possible manner, the processor further executes obtaining a total match degree between the selected address information and the to-be-found destination address information according to the first match degree, which further includes performing matching calculation between the selected address information and the to-be-found destination address information to obtain a second match degree, and obtaining the total match degree between the selected address information and the to-be-found destination address information according to the first match degree and the second match degree.

With reference to the sixth possible implementation manner of the third aspect of the present application, or with reference to the seventh possible implementation manner of the third aspect of the present application, or with reference to the eighth possible implementation manner of the third aspect of the present application, in a ninth possible manner, the processor further executes performing matching calculation between sub-address information included in the to-be-found destination address and the sub-address information included in the selected address information to obtain a first match degree, which includes for each piece of sub-address information included in the to-be-found destination address information, finding, from the selected address information, sub-address information whose address type is the same as that of the sub-address information for the sub-address information, calculating an editing distance required for mutual conversion between the sub-address information and the found sub-address information, and calculating the first match degree according to an editing distance obtained corresponding to each piece of sub-address information included in the to-be-found destination address information.

With reference to the sixth possible implementation manner of the third aspect of the present application, or with reference to the seventh possible implementation manner of the third aspect of the present application, or with reference to the eighth possible implementation manner of the third aspect of the present application, or with reference to the ninth possible implementation manner of the third aspect of the present application, in a tenth possible manner, the processor further executes setting address information that is obtained by matching and whose match degree is greater than a set threshold as found destination address information for output, which includes obtaining, by means of calculation, a total match degree between address information selected each time and the to-be-found destination address information, and determining in sequence a set quantity of total match degrees in descending order of the total match degrees, and setting address information selected corresponding to the determined total match degrees as the found destination address information for output.

The present application has the following beneficial effect.

In the embodiments of the present application, address search request information is acquired, and to-be-found destination address information included in the address search request information is determined. The destination address information is split into at least one piece of sub-address information, where the destination address information is formed by multiple pieces of sub-address information, and the multiple pieces of sub-address information respectively correspond to different address types. The at least one piece of sub-address information or the at least one piece of sub-address information and the destination address information are matched with different address information included in an address database, where each piece of address information stored in the address database includes different sub-address information that forms the address information, and address information that is obtained by the matching and whose match degree is greater than a set threshold is used as found destination address information for output. In the embodiments of the present application, when address search request information is acquired, sub-address information corresponding to destination address information is extracted from the address search request information, which improves correctness of extraction of destination address information. The extracted sub-address information and the destination address information are matched with different address information included in an address database, and then address information whose match degree is greater than a set threshold is used as found destination address information, which effectively increases correctness of address matching and accuracy of address searching.

BRIEF DESCRIPTION OF DRAWINGS

To describe the technical solutions in the embodiments of the present application more clearly, the following briefly introduces the accompanying drawings required for describing the embodiments. The accompanying drawings in the following description show merely some embodiments of the present application, and a person of ordinary skill in the art may still derive other drawings from these accompanying drawings without creative efforts.

DESCRIPTION OF EMBODIMENTS

To achieve an objective of the present application, embodiments of the present application provide an address search method and device, including acquiring address search request information, determining to-be-found destination address information included in the address search request information, splitting the destination address information into at least one piece of sub-address information, where the destination address information is formed by multiple pieces of sub-address information, and the multiple pieces of sub-address information respectively correspond to different address types, matching the at least one piece of sub-address information or the at least one piece of sub-address information and the destination address information with different address information included in an address database, where each piece of address information stored in the address database includes different sub-address information that forms the address information, and setting address information that is obtained by the matching and whose match degree is greater than a set threshold as found destination address information for output. In the embodiments of the present application, sub-address information corresponding to destination address information is extracted from the address search request information when address search request information is acquired, which improves correctness of extraction of destination address information. The extracted sub-address information and the destination address information are matched with different address information included in an address database, and then address information whose match degree is greater than a set threshold is used as found destination address information, which effectively increases correctness of address matching and accuracy of address searching.

The following further describes the embodiments of the present application in detail with reference to accompanying drawings in this specification. The described embodiments are merely some but not all of the embodiments of the present application. All other embodiments obtained by a person of ordinary skill in the art based on the embodiments of the present application without creative efforts shall fall within the protection scope of the present application.

Embodiment 1

Figure 1:
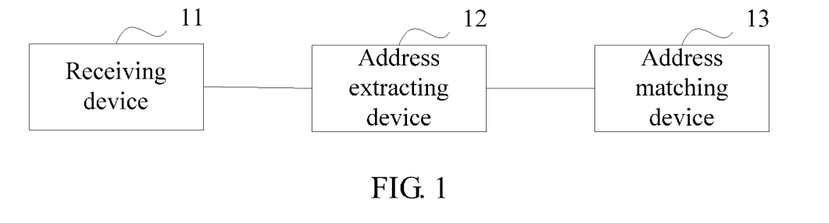
FIG. 1 is a schematic structural diagram of an address search system according to Embodiment 1 of the present application.

As shown in FIG. 1, FIG. 1 is a schematic structural diagram of an address search system according to Embodiment 1 of the present application. The address search system includes a receiving device 11, an address extracting device 12, and an address matching device 13.

The receiving device 11 is configured to acquire address search request information.

The address extracting device 12 is configured to determine to-be-found destination address information included in the address search request information, and split the destination address information into at least one piece of sub-address information, where the destination address information is formed by multiple pieces of sub-address information, and the multiple pieces of sub-address information respectively correspond to different address types.

The receiving device 11 is further configured to receive entered text data, where the text data is used to initiate an address search.

The address extracting device 12 is further configured to perform recognition on the text data to obtain the to-be-found destination address information included in the text data.

For example, the entered text data that is received is "Exit No. 4, Caoyang Road Station, Shanghai." Therefore, it can be determined that the to-be-found destination address information included in the text data is Exit No. 4, Caoyang Road Station, Shanghai.

The receiving device 11 is further configured to receive entered voice data, where the voice data is used to initiate an address search.

The address extracting device 12 is further configured to perform recognition on the voice data to obtain the to-be-found destination address information included in the voice data.

For example, the entered voice data that is received is "go to Exit No. 4, Caoyang Road Station, Shanghai." Therefore, it can be determined that the to-be-found destination address information included in the voice data is, Exit No. 4, Caoyang Road Station, Shanghai.

That is, in addition to including the to-be-found destination address information, the address search request information may further include other auxiliary information according to a language habit, for example, text information such as "go to."

The address extracting device 12 is further configured to obtain the to-be-found destination address information in the manner of determining at least one keyword included in the address search request information, finding, from preset text address dictionaries corresponding to different address types, a text address dictionary including the keyword for each determined keyword, and replacing the keyword with a string used to denote an address type corresponding to the found text address dictionary, determining, using a regular expression used to represent address information, whether a string group formed after each keyword is replaced with a corresponding string represents address information, determining, according to the string group, a quasi address string corresponding to the to-be-found destination address information when the string group represents address information, and setting the quasi address string as a CRF feature, and extracting the to-be-found destination address information from the address search request information based on a CRF algorithm.

It should be noted that the address information is hierarchical. That is, there is address information that represents an address region, such as address information corresponding to an administrative region, for example, Beijing serves as a piece of address information, and then "Beijing" corresponds to an address region on a map. There is also address information that represents a specific location, for example, XX Building, No. XX, XX Road, XX District, XX City, where this piece of address information corresponds to a specific location of XX Building.

Therefore, address information is classified to different address types according to different levels of address information. The address type includes one or a combination of multiple of the following information, administrative region information, road name information, building/organization name information, auxiliary content of the road name, and auxiliary content of the building/organization name.

For example, for the address information "Room XX, Floor XX, XX Building, No. XX, XX Road, XX District, XX City", an address type corresponding to "XX District, XX City" is administrative region information, an address type corresponding to "XX Road" is road name information, an address type corresponding to "No. XX" is auxiliary content of the road name, an address type corresponding to "XX Building" is building/organization name information, and an address type corresponding to "Room XX, Floor XX" is auxiliary content of the building/organization name.

It should be noted that the auxiliary content of the road name indicates that it is meaningless without the road name in front of it, and a specific address cannot be located using the auxiliary content of the road name alone, likewise, the auxiliary content of the building/organization name indicates that it is also meaningless without the building/organization name in front of it, and a specific address cannot be located using the auxiliary content of the building/organization name alone.

The preset text address dictionaries corresponding to different address types include at least an administrative region dictionary, which further includes administrative region information such as province, city, district, county, township, village, autonomous prefecture, league, and banner, which is, for example, Beijing Municipality, Beijing, Shanghai Municipality, Shanghai, Shenzhen City, and Shenzhen, an organization/building end word dictionary, which includes end-words of names of building/organizations, for example, police station, building, and center, a street name dictionary, which includes street names, for example, XX Road, XX Street, and XX Station. In addition, the following dictionaries are also included a stop word dictionary, which includes words or phrases that convey the meaning of stop, for example, arrive, a symbol dictionary, which includes punctuation marks, and a number dictionary, which includes numbers and the like.

For example, the at least one keyword included in the address search request information is "go to," "Shanghai," "Caoyang Road," "Station," and "Exit No. 4."

In this case, for each obtained keyword, execute the following steps.

Step 1: Find, from the preset text address dictionaries corresponding to different address types, a text address dictionary including the keyword, and replace the keyword using a string used to represent an address type corresponding to the found text address dictionary.

For example, "go to" belongs to the stop word dictionary, "Shanghai" belongs to the administrative region dictionary, "Caoyang Road" and "Station" belong to the street name dictionary, "4" in "Exit No. 4" belongs to the number dictionary, and "No." and "Exit" in "Exit No. 4" belong to the end word dictionary.

A string of an address type corresponding to the stop word dictionary is SSS, a string of an address type corresponding to the administrative region dictionary is AAA, a string of an address type corresponding to the street name dictionary is RRR, a string of an address type corresponding to the number dictionary is DDD, and a string of an address type corresponding to the end word dictionary is OOO.

Then a string group obtained after the replacement may be SSSAAARRRRRRDDDOOOOOO, or may be SSSAAA City RRR Road Station DDDOOOOOO. Whether a text used to represent an address type in the keyword is replaced is not limited herein.

Step 2: Determine, using a regular expression used to represent address information, whether a string group formed after each keyword is replaced with a corresponding string represents address information, and determine, according to the string group, a quasi address string corresponding to the to-be-found destination address information when the string group represents address information.

It should be noted that a regular expression describes and matches, using a single string, a string that meets a syntactical rule, and the regular expression involved in this embodiment of the present application describes address information.

For example, for the string group formed after each keyword is replaced with the corresponding string, whether the string group represents address information is determined using a regular expression.

"AAA City" and "RRR Road Station" may represent address information according to the determining using the regular expression, "SSS" may not represent address information according to the determining using the regular expression.

Step 3: Set the quasi address string as a CRF feature, and extract the to-be-found destination address information from the address search request information based on a CRF algorithm.

It should be noted that the quasi address string is used as a CRF feature, but a CRF feature for extracting the destination address information based on the CRF algorithm is not limited to the quasi address string alone, and multiple strings may further be included. However, the CRF feature for extracting the destination address information based on the CRF algorithm includes the CRF feature served by the quasi address string.

In this case, the extracted destination address information is Exit No. 4, Caoyang Road Station, Shanghai.

That the address extracting device 12 is determining the quasi address string corresponding to the to-be-found destination address information which includes determining that multiple strings are included in the string group, and that keywords that are respectively replaced with the multiple strings are continuous in position in the address search request information, combining the multiple strings into one string group based on continuity of positions of the replaced keywords, as the quasi address string corresponding to the to-be-found destination address information if none of the multiple strings is a duplicate, and removing the duplicate string if any of the multiple strings is a duplicate, and combining at least one string obtained after the duplicate string is removed into one string group based on continuity of positions of the replaced keywords, as the quasi address string corresponding to the to-be-found destination address information.

For example, none of the obtained multiple strings, AAA City, RRR Road Station, and DDD, is a duplicate, and then a quasi address string, AAA City RRR Road Station DDD, is obtained by means of combination.

One of the obtained multiple strings, AAA, RRR, RRR, DDD, OOO, and OOO, is a duplicate, and then a quasi address string, AAARRRDDDOOO, is obtained by means of combination.

The address extracting device 12 is further configured to split the destination address information into at least one piece of sub-address information, where the destination address information is formed by multiple pieces of sub-address information, and the multiple pieces of sub-address information respectively correspond to different address types.

The address extracting device 12 is further configured to split, according to the address types represented by the preset text address dictionaries corresponding to different address types, the destination address information into sub-address information corresponding to the different address types.

For example, sub-address information obtained by splitting "Exit No. 4, Caoyang Road Station, Shanghai" is Shanghai, administrative region information, Caoyang Road Station, street name information, and Exit No. 4, auxiliary information of the street name.

The address matching device 13 is configured to match the at least one piece of sub-address information or the at least one piece of sub-address information and the destination address information with different address information included in an address database, where each piece of address information stored in the address database includes different sub-address information that forms the address information, and set address information that is obtained by the matching and whose match degree is greater than a set threshold as found destination address information for output.

The address matching device 13 is further configured to correspondingly match each of the at least one piece of sub-address information in the destination address information with sub-address information of a same address type in the address database.

The address matching device 13 is further configured to select one piece of address information from the address database, and determine sub-address information included in the selected address information, perform matching calculation between each of the at least one piece of sub-address information included in the to-be-found destination address and the sub-address information included in the selected address information to obtain a first match degree, where an address type of the sub-address information that is included in the to-be-found destination address and for which matching calculation is performed is the same as an address type of the sub-address information included in the selected address information, and obtain a total match degree between the selected address information and the to-be-found destination address information according to the first match degree.

That is, each of the at least one piece of sub-address information in the destination address information is matched with sub-address information of a same address type in the address database. The address matching device 13 performs, using an address type corresponding to the sub-address information as a granularity, matching calculation in sequence between the sub-address information that represents an address type in the to-be-found destination address information and the sub-address information that represents the same address type in the selected address information, and obtains, by means of calculation, the first match degree corresponding to the sub-address information.

In this case, a total match degree between the selected address information and the to-be-found destination address information is obtained according to the first match degree.

Optionally, on this basis, matching calculation is performed between the to-be-found destination address information and the selected address information to obtain a second match degree.

By performing the two steps of match degree calculation, address information that includes only one or a few pieces of sub-address information of the to-be-found destination address information, for example, address information that includes only Exit No. 4, is effectively excluded from the address information obtained using the first match degree.

The total match degree between the selected address information and the to-be-found destination address information is obtained according to the first match degree and the second match degree.

That the address matching device 13 is performing matching calculation between sub-address information included in the to-be-found destination address and the sub-address information included in the selected address information to obtain a first match degree further includes for each piece of sub-address information included in the to-be-found destination address information, finding, from the selected address information, sub-address information whose address type is the same as that of the sub-address information for the sub-address information, calculating an editing distance required for mutual conversion between the sub-address information and the found sub-address information, and calculating the first match degree according to an editing distance obtained corresponding to each piece of sub-address information included in the to-be-found destination address information.

It should be noted that the editing distance refers to a minimum quantity of editing operations required for converting one string into the other string between two strings. The so-called editing operation refers to replacing one character with another character, or inserting one character, or deleting one character, or the like.

That the address matching device 13 is calculating the first match degree according to an editing distance obtained corresponding to each piece of sub-address information included in the to-be-found destination address information further includes calculating a sum of editing distances obtained separately corresponding to sub-address information included in the to-be-found destination address information, where the sum is the first match degree.

That the address matching device 13 is setting address information that is obtained by the matching and whose match degree is greater than a set threshold as found destination address information for output further includes obtaining, by means of calculation, a total match degree between address information selected each time and the to-be-found destination address information, and determining in sequence a set quantity of total match degrees in descending order of the total match degrees, and setting address information selected corresponding to the determined total match degrees as the found destination address information for output.

It should be noted that the set similarity threshold may be defined by a system default parameter, or may be determined according to an actual requirement, which is not limited herein.

It should be noted that the set quantity may be defined by a system default parameter, or may be determined according to an actual requirement, which is not limited herein.

According to the address search system provided in the embodiments of the present application, sub-address information corresponding to destination address information is extracted from the address search request information when address search request information is acquired, which improves correctness of extraction of destination address information. The extracted sub-address information and the destination address information are matched with different address information included in an address database, and then address information whose match degree is greater than a set threshold is used as found destination address information, which effectively increases correctness of address matching and accuracy of address searching.

Embodiment 2

Figure 2:
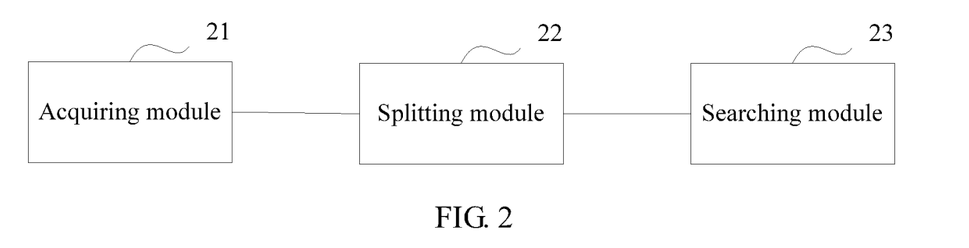
FIG. 2 is a schematic structural diagram of an address search device according to Embodiment 2 of the present application.

As shown in FIG. 2, FIG. 2 is a schematic structural diagram of an address search device according to Embodiment 2 of the present application. The address search device includes an acquiring module 21, a splitting module 22, and a searching module 23, where the acquiring module 21 is configured to acquire address search request information, and determine to-be-found destination address information included in the address search request information. The splitting module 22 is configured to split the destination address information determined by the acquiring module 21 into at least one piece of sub-address information, where the destination address information is formed by multiple pieces of sub-address information, and the multiple pieces of sub-address information respectively correspond to different address types, and the searching module 23 is configured to match the at least one piece of sub-address information obtained by the splitting module 22 or the at least one piece of sub-address information and the destination address information with different address information included in an address database, where each piece of address information stored in the address database includes different sub-address information that forms the address information, and set address information that is obtained by the matching and whose match degree is greater than a set threshold as found destination address information for output.

The acquiring module 21 is further configured to receive entered voice data, where the voice data is used to initiate an address search, and perform recognition on the voice data to obtain the to-be-found destination address information included in the voice data.

The acquiring module 21 is further configured to obtain the to-be-found destination address information in the manner of determining at least one keyword included in the address search request information, finding, from preset text address dictionaries corresponding to different address types, a text address dictionary including the keyword for each determined keyword, and replacing the keyword with a string used to denote an address type corresponding to the found text address dictionary, determining, using a regular expression used to represent address information, whether a string group formed after each keyword is replaced with a corresponding string represents address information, determining, according to the string group, a quasi address string corresponding to the to-be-found destination address information when the string group represents address information, and setting the quasi address string as a CRF feature, and extracting the to-be-found destination address information from the address search request information based on a CRF algorithm.

That the acquiring module 21 determining the quasi address string corresponding to the to-be-found destination address information further includes determining that multiple strings are included in the string group, and keywords that are respectively replaced with the multiple strings are continuous in position in the address search request information, combining the multiple strings into one string group based on continuity of positions of the replaced keywords, as the quasi address string corresponding to the to-be-found destination address information if none of the multiple strings is a duplicate, and removing the duplicate string if any of the multiple strings is a duplicate, and combining at least one string obtained after the duplicate string is removed into one string group based on continuity of positions of the replaced keywords, as the quasi address string corresponding to the to-be-found destination address information.

The splitting module 22 is further configured to split, according to the address types represented by the preset text address dictionaries corresponding to different address types, the destination address information into sub-address information corresponding to the different address types.

The address type includes one or a combination of multiple of the following information, administrative region information, road name information, building/organization name information, auxiliary content of the road name, and auxiliary content of the building/organization name.

The searching module 23 is further configured to correspondingly match each of the at least one piece of sub-address information in the destination address information with sub-address information of a same address type in the address database.

The searching module 23 is further configured to select one piece of address information from the address database, and determine sub-address information included in the selected address information, perform matching calculation between each of the at least one piece of sub-address information included in the to-be-found destination address and the sub-address information included in the selected address information to obtain a first match degree, where an address type of the sub-address information that is included in the to-be-found destination address and for which matching calculation is performed is the same as an address type of the sub-address information included in the selected address information, and obtain a total match degree between the selected address information and the to-be-found destination address information according to the first match degree.

That the searching module 23 is obtaining a total match degree between the selected address information and the to-be-found destination address information according to the first match degree further includes performing matching calculation between the selected address information and the to-be-found destination address information to obtain a second match degree, and obtaining the total match degree between the selected address information and the to-be-found destination address information according to the first match degree and the second match degree.

That the searching module 23 is performing matching calculation between sub-address information included in the to-be-found destination address and the sub-address information included in the selected address information to obtain a first match degree further includes for each piece of sub-address information included in the to-be-found destination address information, finding, from the selected address information, sub-address information whose address type is the same as that of the sub-address information for the sub-address information, calculating an editing distance required for mutual conversion between the sub-address information and the found sub-address information, and calculating the first match degree according to an editing distance obtained corresponding to each piece of sub-address information included in the to-be-found destination address information.

That the searching module 23 is setting address information that is obtained by matching and whose match degree is greater than a set threshold as found destination address information for output further includes obtaining, by means of calculation, a total match degree between address information selected each time and the to-be-found destination address information, and determining in sequence a set quantity of total match degrees in descending order of the total match degrees, and setting address information selected corresponding to the determined total match degrees as the found destination address information for output.

It should be noted that the address search device described in this embodiment of the present application may be implemented by means of hardware, or may be implemented by means of software, and an implementation manner is not limited herein.

The address search device, extracts sub-address information corresponding to destination address information from the address search request information when acquiring address search request information, which improves correctness of extraction of destination address information, and matches the extracted sub-address information and the destination address information with different address information included in an address database, and then sets address information whose match degree is greater than a set threshold as found destination address information, which effectively increases correctness of address matching and accuracy of address searching.

Embodiment 3

Figure 3:
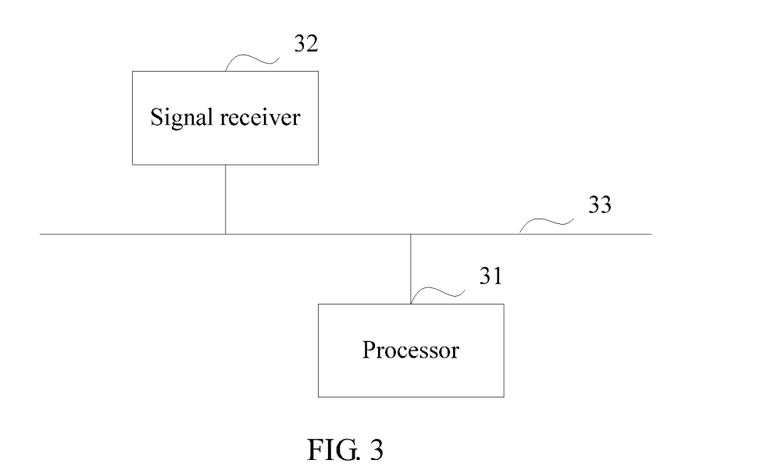
FIG. 3 is a schematic structural diagram of an address search device according to Embodiment 3 of the present application.

As shown in FIG. 3, FIG. 3 is a schematic structural diagram of an address search device according to Embodiment 3 of the present application. The address search device has functions described in Embodiment 4 of the present application. The address search device may use a general computer system structure, where the computer system may further be a processor-based computer. The address search device includes at least one processor 31 and a signal receiver 32. The processor 31 and the signal receiver 32 are connected using a communications bus 33.

The signal receiver 32 is configured to acquire address search request information, and determine to-be-found destination address information included in the address search request information.

The processor 31 is configured to split the destination address information into at least one piece of sub-address information, where the destination address information is formed by multiple pieces of sub-address information, and the multiple pieces of sub-address information respectively correspond to different address types, match the at least one piece of sub-address information or the at least one piece of sub-address information and the destination address information with different address information included in an address database, where each piece of address information stored in the address database includes different sub-address information that forms the address information, and set address information that is obtained by matching and whose match degree is greater than a set threshold as found destination address information for output.

In a possible implementation manner, the processor 31 further executes receiving entered voice data, where the voice data is used to initiate an address search, and performing recognition on the voice data to obtain the to-be-found destination address information included in the voice data.

In a possible implementation manner, the processor 31 further executes obtaining to-be-found destination address information in the following manner. Determining at least one keyword included in the address search request information, finding, from preset text address dictionaries corresponding to different address types, a text address dictionary including the keyword for each determined keyword, and replacing the keyword with a string used to denote an address type corresponding to the found text address dictionary, determining, using a regular expression used to represent address information, whether a string group formed after each keyword is replaced with a corresponding string represents address information, determining, according to the string group, a quasi address string corresponding to the to-be-found destination address information when the string group represents address information, setting the quasi address string as a CRF feature, and extracting the to-be-found destination address information from the address search request information based on a CRF algorithm.

In a possible implementation manner, the processor 31 further executes determining that multiple strings are included in the string group, and keywords that are respectively replaced with the multiple strings are continuous in position in the address search request information, combining the multiple strings into one string group based on continuity of positions of the replaced keywords, as the quasi address string corresponding to the to-be-found destination address information if none of the multiple strings is a duplicate, and removing the duplicate string if any of the multiple strings is a duplicate, and combining at least one string obtained after the duplicate string is removed into one string group based on continuity of positions of the replaced keywords, as the quasi address string corresponding to the to-be-found destination address information.

In a possible implementation manner, the processor 31 further executes splitting the destination address information into at least one piece of sub-address information, which includes splitting, according to the address types represented by the preset text address dictionaries corresponding to different address types, the destination address information into sub-address information corresponding to the different address types.

In a possible implementation manner, the address type includes one or a combination of multiple of the following information, administrative region information, road name information, building/organization name information, auxiliary content of the road name, and auxiliary content of the building/organization name.

In a possible implementation manner, the processor 31 further executes correspondingly matching each of the at least one piece of sub-address information in the destination address information with sub-address information of a same address type in the address database.

In a possible implementation manner, the processor 31 further executes matching the at least one piece of sub-address information or the at least one piece of sub-address information and the destination address information with different address information included in an address database, which includes selecting one piece of address information from the address database, and determining sub-address information included in the selected address information, performing matching calculation between each of the at least one piece of sub-address information included in the to-be-found destination address and the sub-address information included in the selected address information to obtain a first match degree, where an address type of the sub-address information that is included in the to-be-found destination address and for which matching calculation is performed is the same as an address type of the sub-address information included in the selected address information, and obtaining a total match degree between the selected address information and the to-be-found destination address information according to the first match degree.

In a possible implementation manner, the processor 31 further executes obtaining a total match degree between the selected address information and the to-be-found destination address information according to the first match degree, which further includes performing matching calculation between the selected address information and the to-be-found destination address information to obtain a second match degree, and obtaining the total match degree between the selected address information and the to-be-found destination address information according to the first match degree and the second match degree.

In a possible implementation manner, the processor 31 further executes performing matching calculation between sub-address information included in the to-be-found destination address and the sub-address information included in the selected address information to obtain a first match degree, which includes for each piece of sub-address information included in the to-be-found destination address information, finding, from the selected address information, sub-address information whose address type is the same as that of the sub-address information for the sub-address information, calculating an editing distance required for mutual conversion between the sub-address information and the found sub-address information, and calculating the first match degree according to an editing distance obtained corresponding to each piece of sub-address information included in the to-be-found destination address information.

In a possible implementation manner, the processor 31 further executes setting address information that is obtained by matching and whose match degree is greater than a set threshold as found destination address information for output, which includes obtaining, by means of calculation, a total match degree between address information selected each time and the to-be-found destination address information, and determining in sequence a set quantity of total match degrees in descending order of the total match degrees, and setting address information selected corresponding to the determined total match degrees as the found destination address information for output.

The processor 31 may be a general purpose central processing unit (CPU), a microprocessor, an application-specific integrated circuit (ASIC), or one or more integrated circuits used to control execution of the solution program of the present application.

The address search device provided in this embodiment of the present application, when acquiring address search request information, extracts sub-address information corresponding to destination address information from the address search request information, which improves correctness of extraction of destination address information, and matches the extracted sub-address information and the destination address information with different address information included in an address database, and then sets address information whose match degree is greater than a set threshold as found destination address information, which effectively increases correctness of address matching and accuracy of address searching.

Embodiment 4

Figure 4:
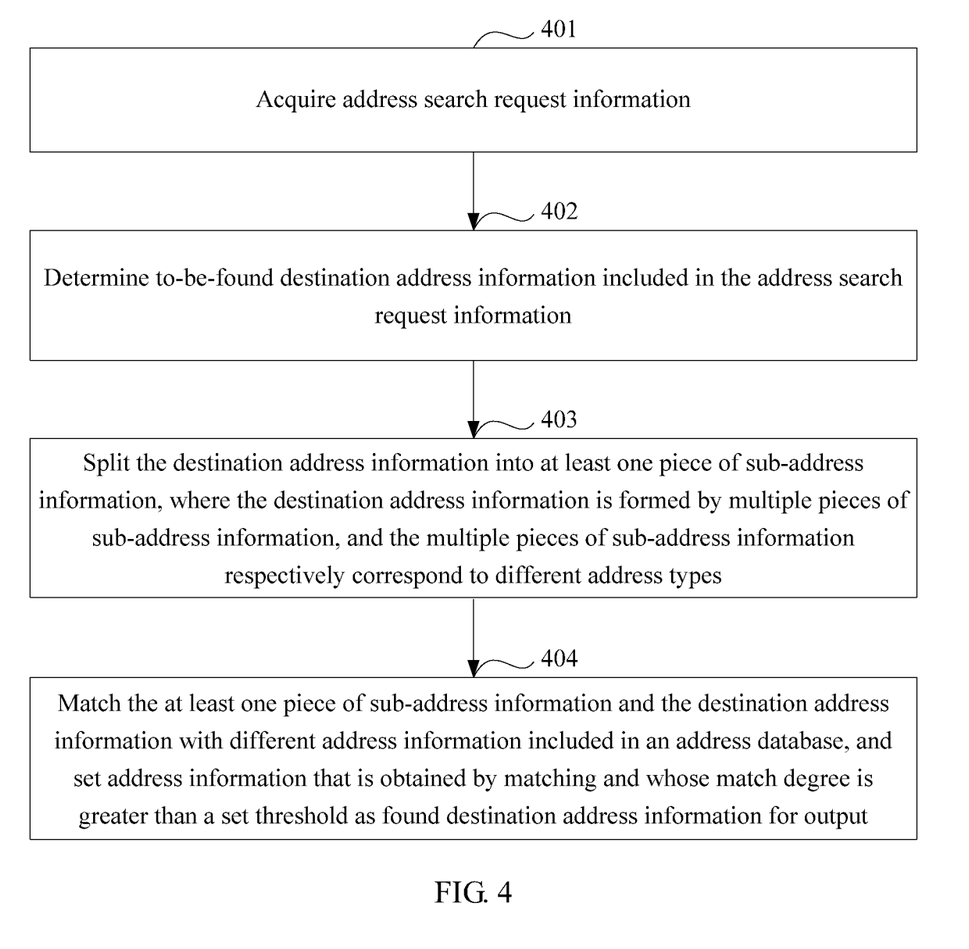
FIG. 4 is a schematic flowchart of an address search method according to Embodiment 4 of the present application.

As shown in FIG. 4, FIG. 4 is a schematic flowchart of an address search method according to Embodiment 4 of the present application. The method may be shown in the following steps.

Step 401: Acquire address search request information.

The address search request information includes to-be-found destination address information.

In step 401, a manner for acquiring the address search request information includes but is not limited to the following manner. Receiving entered text data, where the text data is used to initiate an address search, or receiving entered voice data, where the voice data is used to initiate an address search.

It should be noted that, if the address search request information is voice data, then the method further includes performing recognition on the received voice data to obtain text data corresponding to the voice data.

Step 402: Determine to-be-found destination address information included in the address search request information.

In step 402, the to-be-found destination address information is obtained in the following manner. Determining at least one keyword included in the address search request information, finding, from preset text address dictionaries corresponding to different address types, a text address dictionary including the keyword for each determined keyword, and replacing the keyword with a string used to denote an address type corresponding to the found text address dictionary, determining, using a regular expression used to represent address information, whether a string group formed after each keyword is replaced with a corresponding string represents address information, determining, according to the string group, a quasi address string corresponding to the to-be-found destination address information when the string group represents address information, and setting the quasi address string as a CRF feature, and extracting the to-be-found destination address information from the address search request information based on a CRF algorithm.

Further, the address information is hierarchical. That is, there is address information that represents an address region, such as address information corresponding to an administrative region, for example, Beijing serves as a piece of address information, and then "Beijing" corresponds to an address region on a map. There is also address information that represents a specific location, for example, XX Building, No. XX, XX Road, XX District, XX City, where this piece of address information corresponds to a specific location of XX Building.

Therefore, address information is classified to different address types according to different levels of address information. The address type includes one or a combination of multiple of the following information, administrative region information, road name information, building/organization name information, auxiliary content of the road name, and auxiliary content of the building/organization name.

For example, for the address information "Room XX, Floor XX, XX Building, No. XX, XX Road, XX District, XX City", an address type corresponding to "XX District, XX City" is administrative region information, an address type corresponding to "XX Road" is road name information, an address type corresponding to "No. XX" is auxiliary content of the road name, an address type corresponding to "XX Building" is building/organization name information, and an address type corresponding to "Room XX, Floor XX" is auxiliary content of the building/organization name.

It should be noted that the auxiliary content of the road name indicates that it is meaningless without the road name in front of it, and a specific address cannot be located using the auxiliary content of the road name alone. Likewise, the auxiliary content of the building/organization name indicates that it is also meaningless without the building/organization name in front of it, and a specific address cannot be located using the auxiliary content of the building/organization name alone.

The preset text address dictionaries corresponding to different address types include at least an administrative region dictionary, which further includes administrative region information such as province, city, district, county, township, village, autonomous prefecture, league, and banner, which is further, for example, Beijing Municipality, Beijing, Shanghai Municipality, Shanghai, Shenzhen City, and Shenzhen, an organization/building end word dictionary, which includes end words of names of buildings/organizations, for example, police station, building, and center, a street name dictionary, which includes street names, for example, XX Road, XX Street, and XX Station. In addition, the following dictionaries are also included. A stop word dictionary, which includes words or phrases that convey the meaning of stop, for example, arrive, a symbol dictionary, which includes punctuation marks, and a number dictionary, which includes numbers and the like.

For example, the at least one keyword included in the address search request information is "go to," "Shanghai," "Caoyang Road," "Station," and "Exit No. 4."

In this case, for each obtained keyword, execute the following steps.

Step 1: Find, from the preset text address dictionaries corresponding to different address types, a text address dictionary including the keyword, and replace the keyword using a string used to represent an address type corresponding to the found text address dictionary.

For example, "go to" belongs to the stop word dictionary, "Shanghai" belongs to the administrative region dictionary, "Caoyang Road" and "Station" belong to the street name dictionary, "4" in "Exit No. 4" belongs to the number dictionary, and "No." and "Exit" in "Exit No. 4" belong to the end word dictionary.

A string of an address type corresponding to the stop word dictionary is SSS, a string of an address type corresponding to the administrative region dictionary is AAA, a string of an address type corresponding to the street name dictionary is RRR, a string of an address type corresponding to the number dictionary is DDD, and a string of an address type corresponding to the end word dictionary is 000.

Then a string group obtained after the replacement may be SSSAAARRRRRRDDDOOOOOO, or may be SSSAAA City RRR Road Station DDDOOOOOO. Whether a text used to represent an address type in the keyword is replaced is not limited herein.

Step 2: Determine, using a regular expression used to represent address information, whether a string group formed after each keyword is replaced with a corresponding string represents address information, and determine, according to the string group, a quasi address string corresponding to the to-be-found destination address information when the string group represents address information.

It should be noted that a regular expression describes and matches, using a single string, a string that meets a syntactical rule, and the regular expression involved in this embodiment of the present application describes address information.

For example, for the string group formed after each keyword is replaced with the corresponding string, whether the string group represents address information is determined using a regular expression.

"AAA City" and "RRR Road Station" may represent address information according to the determining using the regular expression, "SSS" may not represent address information according to the determining using the regular expression.

Step 3 Set the quasi address string as a CRF feature, and extract the to-be-found destination address information from the address search request information based on a CRF algorithm.

It should be noted that the quasi address string is used as a CRF feature, but a CRF feature for extracting the destination address information based on the CRF algorithm is not limited to only the one CRF feature served by the quasi address string, and multiple CRF features may further be included. However, the CRF feature for extracting the destination address information based on the CRF algorithm includes the CRF feature served by the quasi address string.

In this case, the extracted destination address information is Exit No. 4, Caoyang Road Station, Shanghai.

Optionally, determining, according to the string group, a quasi address string corresponding to the to-be-found destination address information further includes determining that multiple strings are included in the string group, and that keywords that are respectively replaced with the multiple strings are continuous in position in the address search request information, combining the multiple strings into one string group based on continuity of positions of the replaced keywords, as the quasi address string corresponding to the to-be-found destination address information if none of the multiple strings is a duplicate, and removing the duplicate string if any of the multiple strings is a duplicate, and combining at least one string obtained after the duplicate string is removed into one string group based on continuity of positions of the replaced keywords, as the quasi address string corresponding to the to-be-found destination address information.

Step 403: Split the destination address information into at least one piece of sub-address information, where the destination address information is formed by multiple pieces of sub-address information, and the multiple pieces of sub-address information respectively correspond to different address types.

In step 403, the destination address information is split, according to the address types represented by the preset text address dictionaries corresponding to different address types, into sub-address information corresponding to the different address types.

For example, sub-address information obtained by splitting "Exit No. 4, Caoyang Road Station, Shanghai" is Shanghai, administrative region information, Caoyang Road Station, street name information, and Exit No. 4, auxiliary information of the street name.

Step 404: Match the at least one piece of sub-address information or the at least one piece of sub-address information and the destination address information with different address information included in an address database, and set address information that is obtained by matching and whose match degree is greater than a set threshold as found destination address information for output.

Each piece of address information stored in the address database includes different sub-address information that forms the address information.

In step 404, first, one piece of address information is selected from the address database, and sub-address information included in the selected address information is determined.

Second, matching calculation is performed between each of the at least one piece of sub-address information included in the to-be-found destination address and the sub-address information included in the selected address information to obtain a first match degree, where an address type of the sub-address information that is included in the to-be-found destination address and for which matching calculation is performed is the same as an address type of the sub-address information included in the selected address information.

Performing matching calculation between sub-address information included in the to-be-found destination address and the sub-address information included in the selected address information to obtain a first match degree further includes for each piece of sub-address information included in the to-be-found destination address information, finding, from the selected address information, sub-address information whose address type is the same as that of the sub-address information for the sub-address information, calculating an editing distance required for mutual conversion between the sub-address information and the found sub-address information, and calculating the first match degree according to an editing distance obtained corresponding to each piece of sub-address information included in the to-be-found destination address information.

It should be noted that the editing distance refers to a minimum quantity of editing operations required for converting one string into the other string between two strings. The so-called editing operation refers to replacing one character with another character, or inserting one character, or deleting one character, or the like.

Assuming that one piece of address data selected from the address database is XXX Station, XXX District, XX City. In this case, one piece of sub-address information "Shanghai" is selected from the to-be-found destination address information "Exit No. 4, Caoyang Road Station, Shanghai," and the address type corresponding to "Shanghai" is determined as an administrative region. Then, sub-address information "XX City" that represents the administrative region is found from the "XXX Station, XXX District, XX City," and an editing distance required for performing mutual conversion between "XX City" and "Shanghai" is calculated.

If "XX City" is Shanghai, then the editing distance required for performing mutual conversion between "XX City" and "Shanghai" is 0, if "XX City" is Beijing, then the editing distance required for performing mutual conversion between "XX City" and "Shanghai" is 2.

After the editing distance is determined, a first match degree between the sub-address information in the to-be-found destination address information and the sub-address information of the same address type in the selected address information is obtained according to the editing distance obtained by means of calculation.

For example, the first match degree=1−editing distance/MAX (a quantity of strings corresponding to the sub-address information in the to-be-found destination address information, a quantity of strings corresponding to the sub-address information of the same address type in the selected address information), or, the first match degree=editing distance/MAX (a quantity of strings corresponding to the sub-address information in the to-be-found destination address information, a quantity of strings corresponding to the sub-address information of the same address type in the selected address information).

When a first match degree corresponding to each piece of sub-address information included in the to-be-found destination address information is obtained, a first match degree between the sub-address information included in the to-be-found destination address information and the sub-address information included in the selected address information is obtained according to the obtained first match degree.

Finally, a total match degree between the selected address information and the to-be-found destination address information is obtained according to the first match degree.

One manner is setting the obtained first match degree as the total match degree between the selected address information and the to-be-found destination address information.

Another manner is continuing performing matching calculation between the selected address information and the to-be-found destination address information to obtain a second match degree.

The total match degree between the selected address information and the to-be-found destination address information is obtained according to the first match degree and the second match degree.

The setting address information that is obtained by matching and whose match degree is greater than a set threshold as found destination address information for output further includes obtaining, by means of calculation, a total match degree between address information selected each time and the to-be-found destination address information, and determining in sequence a set quantity of total match degrees in descending order of the total match degrees, and setting address information selected corresponding to the determined total match degrees as the found destination address information for output.

It should be noted that the set similarity threshold may be defined by a system default parameter, or may be determined according to an actual requirement, which is not limited herein.

It should be noted that the set quantity may be defined by a system default parameter, or may be determined according to an actual requirement, which is not limited herein.

According to the solution of Embodiment 4 of the present application, address search request information is acquired, and to-be-found destination address information included in the address search request information is determined. The destination address information is split into at least one piece of sub-address information, where the destination address information is formed by multiple pieces of sub-address information, and the multiple pieces of sub-address information respectively correspond to different address types. The at least one piece of sub-address information or the at least one piece of sub-address information and the destination address information are matched with different address information included in an address database, where each piece of address information stored in the address database includes different sub-address information that forms the address information, and address information that is obtained by the matching and whose match degree is greater than a set threshold is used as found destination address information for output. In the embodiments of the present application, when address search request information is acquired, sub-address information corresponding to destination address information is extracted from the address search request information, which improves correctness of extraction of destination address information. The extracted sub-address information and the destination address information are matched with different address information included in an address database, and then address information whose match degree is greater than a set threshold is used as found destination address information, which effectively increases correctness of address matching and accuracy of address searching.

A person skilled in the art should understand that the embodiments of the present application may be provided as a method, an apparatus (device), or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a compact-disc read-only memory (CD-ROM), an optical memory, and the like) that include computer-usable program code.

The present application is described with reference to the flowcharts and/or block diagrams of the method, the apparatus (device), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some exemplary embodiments of the present application have been described, a person skilled in the art can make changes and modifications to these embodiments once they learn the basic inventive concept. Therefore, the following claims are intended to be construed as to cover the exemplary embodiments and all changes and modifications falling within the scope of the present application.

Obviously, a person skilled in the art can make various modifications and variations to the present application without departing from the scope of the present application. The present application is intended to cover these modifications and variations provided that they fall within the scope of protection defined by the following claims and their equivalent technologies.

What is claimed is:

1. An address search method, comprising:
acquiring address search request information;
determining to-be-found destination address information that is part of the address search request information by:
determining at least one keyword that is part of the address search request information;
finding, for each at least one keyword from preset text address dictionaries corresponding to the different address types, a text address dictionary comprising a respective keyword;
replacing the respective keyword with a string denoting an address type corresponding to the text address dictionary;
determining, using a regular expression used to represent address information, whether a string group formed after each of the at least one keyword is replaced with a corresponding string that represents the to-be-found destination address information;
determining, according to the string group, a quasi address string corresponding to the to-be-found destination address information when the string group represents the address information by:
determining that multiple strings are part of the string group, and that keywords that are respectively replaced with the multiple strings are continuous in position in the address search request information;
combining the multiple strings into one string group based on continuity of positions of the replaced keywords as the quasi address string corresponding to the to-be-found destination address information when none of the multiple strings is a duplicate;
removing a duplicate string when any of the multiple strings is the duplicate; and
combining at least one string obtained after the duplicate string is removed into the one string group based on a continuity of positions of the replaced keywords as the quasi address string corresponding to the to-be-found destination address information;
setting the quasi address string as a conditional random field (CRF) feature; and
extracting the to-be-found destination address information from the address search request information based on a CRF algorithm;
splitting the to-be-found destination address information into at least one piece of sub-address information, wherein the to-be-found destination address information comprises multiple pieces of sub-address information, and wherein the multiple pieces of sub-address information respectively correspond to different address types;
selecting one piece of address information from an address database, wherein each piece of address information stored in the address database comprises different sub-address information that forms the address information;
determining sub-address information that is part of the selected one piece of address information;
performing a matching calculation between each of the at least one piece of sub-address information that is part of the to-be-found destination address information and the sub-address information that is part of the selected one piece of address information to obtain a first match degree;
and
setting address information based on the first match degree being greater than a set threshold as found destination address information for output.

2. The address search method of claim 1, wherein acquiring the address search request information comprises:

receiving voice data, wherein the voice data is used to initiate an address search; and performing recognition on the voice data to obtain the to-be-found destination address information that is part of the voice data.

3. The address search method of claim 1, wherein splitting the destination address information comprises splitting, according to the different address types represented by preset text address dictionaries corresponding to the different address types, the to-be-found destination address information into the multiple pieces of sub-address information corresponding to the different address types.

4. The address search method of claim 1, wherein the address type comprises one or more of:
administrative region information;
road name information;
building/organization name information;
auxiliary content of the road name; or
auxiliary content of the building/organization name.

5. The address search method of claim 1, wherein performing the matching calculation between each of the at least one piece of sub-address information that is part of the to-be-found destination address information and the sub-address information that is part of the selected to-be-found address information comprises correspondingly matching each of the at least one piece of sub-address information in the to-be-found destination address information with sub-address information of a same address type in the address database.

6. The address search method of claim 1, wherein performing the matching calculation between each of the at least one piece of sub-address information that is part of the to-be-found destination address and the sub-address information that is part of the selected one piece of address information to obtain the first match degree comprises:
performing, for each piece of sub-address information that is part of the to-be-found destination address information, the following operations:
finding, for a respective piece of sub-address information, from the selected one piece of address information, sub-address information having an address type that is the same as that of the respective piece of sub-address information;
calculating an editing distance required for mutual conversion between the respective piece of sub-address information and the found sub-address information; and
calculating the match degree according to the editing distance obtained corresponding to each of the at least one piece of sub-address information that is part of the to-be-found destination address information.

7. The address search method of claim 1, wherein setting the address information as the found destination address information for output comprises:
obtaining the total match degree between address information selected each time and the to-be-found destination address information;
determining in sequence a set quantity of total match degrees in descending order of the total match degrees; and
setting address information selected corresponding to the total match degrees as the found destination address information for output.

8. An address search device, comprising:
a memory comprising instructions; and
a processor coupled to the memory and configured to execute the instructions, which cause the processor to be configured to:
acquire address search request information;
determine to-be-found destination address information that is part of the address search request information, wherein to determine the to-be-found destination address information that is part of the address search request information, the instructions cause the processor to be configured to:
determine at least one keyword that is part of the address search request information;
find, for each at least one keyword, from preset text address dictionaries corresponding to the different address types, a text address dictionary comprising a respective keyword;
replace the respective keyword with a string denotating an address type corresponding to the found text address dictionary;
determine, using a regular expression used to represent address information, whether a string group formed after each at least one keyword is replaced with a corresponding string represents the to-be-found destination address information;
determine, according to the string group, a quasi address string corresponding to the to-be-found destination address information when the string group represents the address information, wherein to determine the quasi address string corresponding to the to-be-found destination address information, the instructions cause the processor to be configured to:
determine that multiple strings are part of the string group, and keywords that are respectively replaced with the multiple strings are continuous in position in the address search request information;
combine the multiple strings into one string group based on continuity of positions of the replaced keywords as the quasi address string corresponding to the to-be-found destination address information when none of the multiple strings is a duplicate;
remove a duplicate string when any of the multiple strings is the duplicate; and
combine at least one string obtained after the duplicate string is removed into the one string group based on a continuity of positions of the replaced keywords as the quasi address string corresponding to the to-be-found destination address information;
set the quasi address string as a conditional random field (CRF) feature; and
extract the to-be-found destination address information from the address search request information based on a CRF algorithm;
split the to-be-found destination address information into at least one piece of sub-address information, wherein the to-be-found destination address information is formed by multiple pieces of sub-address information, and wherein the multiple pieces of sub-address information respectively correspond to different address types;
select one piece of address information from an address database, wherein each piece of address information stored in the address database comprises different sub-address information that forms the address information;

determine sub-address information that is part of the selected one piece of address information;

perform a matching calculation between each of the at least one piece of sub-address information that is part of the to-be-found destination address information and the sub-address information that is part of the selected one piece of address information to obtain a first match degree; and set address information based on the first match degree being greater than a set threshold as found destination address information for output.

9. The address search device of claim 8, wherein the instructions further cause the processor to be configured to:
receive voice data, wherein the voice data is used to initiate an address search; and
perform recognition on the voice data to obtain the to-be-found destination address information that is part of the voice data.

10. The address search device of claim 8, wherein the instructions further cause the processor to be configured to split, according to the different address types represented by preset text address dictionaries corresponding to the different address types, the to-be-found destination address information into the multiple pieces of sub-address information corresponding to the different address types.

11. The address search device of claim 8, wherein the address type comprises one or more of:
administrative region information;
road name information;
building/organization name information;
auxiliary content of the road name; or
auxiliary content of the building/organization name.

12. The address search device of claim 8, wherein the instructions further cause the processor to be configured to correspondingly match each of the at least one piece of sub-address information in the to-be-found destination address information with sub-address information of a same address type in the address database.

13. The address search method of claim 1, further comprising:
performing a matching calculation between the selected one piece of address information and the to-be-found destination address information to obtain a second match degree; and
obtaining a total match degree between the selected one piece of address information and the to-be-found destination address information according to the first match degree and the second match degree,
wherein setting address information based on the first match degree being greater than a set threshold as found destination address information for output comprises setting address information based on the total match degree being greater than a set threshold as found destination address information for output.

14. The address search method of claim 1, wherein acquiring the address search request information comprises receiving voice data, wherein the voice data is used to initiate an address search.

15. The address search method of claim 1, wherein address information is classified to different address types according to different levels of address information.

16. The address search method of claim 1, further comprising storing preset text address dictionaries corresponding to different address types.

17. The address search device of claim 8, wherein the instructions further cause the processor to be configured to:
perform a matching calculation between the selected one piece of address information and the to-be-found destination address information to obtain a second match degree; and
obtain a total match degree between the selected one piece of address information and the to-be-found destination address information according to the first match degree and the second match degree, and
wherein to set address information based on the first match degree being greater than a set threshold as found destination address information for output, the instructions further cause the processor to be configured to et address information based on the total match degree being greater than a set threshold as found destination address information for output.

18. The address search device of claim 8, wherein to acquire the address search request information, the instructions further cause the processor to be configured to receive voice data, wherein the voice data is used to initiate an address search.

19. The address search device of claim 8, wherein address information is classified to different address types according to different levels of address information.

20. The address search device of claim 8, wherein the instructions further cause the processor to be configured to store preset text address dictionaries corresponding to different address types.

* * * * *